(No Model.)
C. H. VAUSE.
CONFORMATOR.
No. 496,675. Patented May 2, 1893.
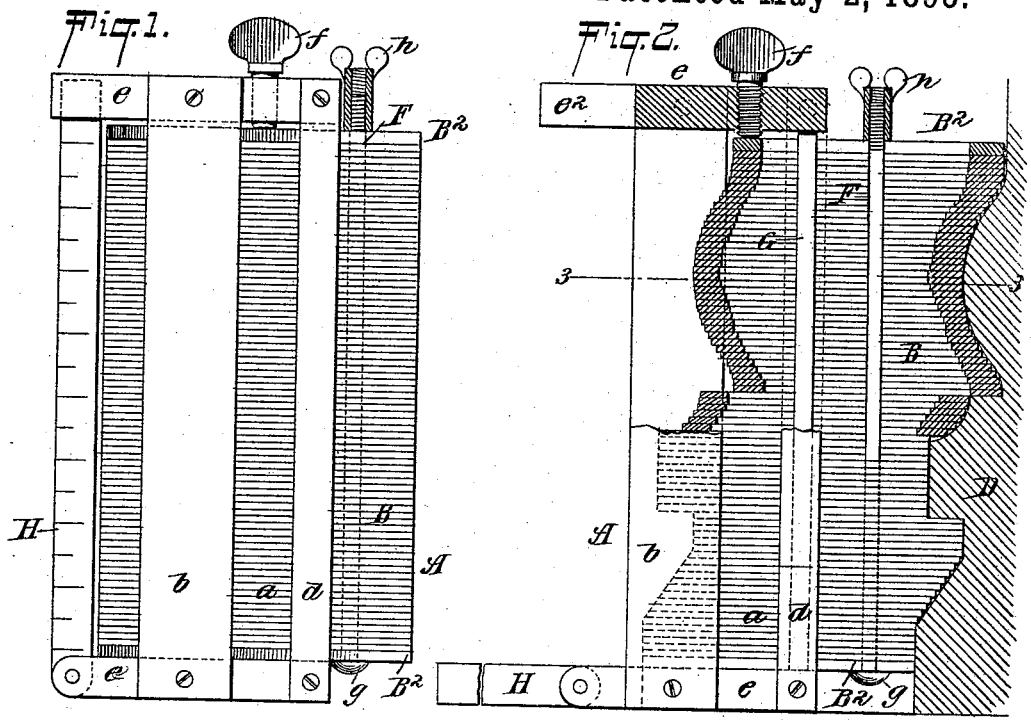
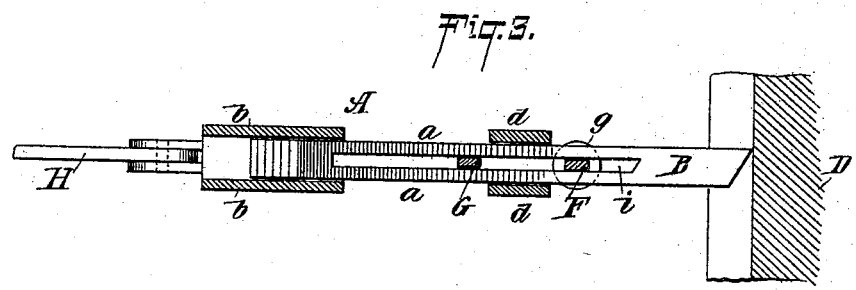
WITNESSES:
William Goebel.
James M. Paul
INVENTOR
Chas. H. Vause
BY
T. F. Bourne
his ATTORNEY.

UNITED STATES PATENT OFFICE.

CHARLES H. VAUSE, OF NEW YORK, N. Y.

CONFORMATOR.

SPECIFICATION forming part of Letters Patent No. 496,675, dated May 2, 1893.

Application filed June 15, 1892. Serial No. 436,870. (No model.)

*To all whom it may concern:*

Be it known that I, CHARLES H. VAUSE, a resident of New York, in the county of New York and State of New York, have invented certain new and useful Improvements in Scribing-Tools, of which the following is a specification.

This invention relates to a tool for taking a copy of the outline of an object, such as moldings, cornices, faces, &c., and it has for its object to provide means to permit a proper adjustment and holding of the sliding plates of the tool.

Another object is to provide means to permit the tool to be held at the proper angle with relation to the position of the object to be copied so that an exact duplicate of the relative positions of the parts can be procured.

Another object is to permit the outer ends of the sliding plates to be firmly held after the outline of the object to be copied has been taken so that the exact positions from point to point of said object can be properly portrayed.

The invention consists in the novel details of improvement and the combinations of parts that will be more fully hereinafter set forth and then pointed out in the claims.

Reference is to be had to the accompanying drawings forming part hereof, wherein—

Figure 1 is a side elevation of my improved scribing tool. Fig. 2, is a partly sectional side view of the same shown adjusted against a molding to take a copy thereof, and Fig. 3, is a sectional plan view on the line 3, 3, in Fig. 2.

In the accompanying drawings the letter A, indicates a frame within which plates or the like B, are placed, one upon another, as shown, by which the outline of an object D, can be copied. The frame A, has a vertical opening $a$, on each side that lies between side bars $b$, $b$, and $d$, $d$, of the frame. The bars $b$, and $d$, are connected to blocks or rods $e$, $e$, as shown, whereby the frame A, is formed. The plates B, are held between the bars $b$, $b$, $d$, $d$, and rods $e$, $e$, whereby said plates are permitted longitudinal movement, but prevented from lateral movement. By means of the spaces $a$, $a$, in the frame A, a person's fingers can be brought into contact with the sides of the plates B, to move and adjust them, which will be found especially useful when the plates are pushed out quite far, as in the center of Fig. 2, the space between bars $b$, $b$, being too narrow to permit the entrance of the fingers to push the plates B.

I prefer to place a thicker or stiffer plate or bar $B^2$, at the top and bottom of the series of plates B, as shown, to enable a firm and even pressure to be applied to the plates B, to hold them in place. By means of a screw $f$, in one block or rod $e$, pressure may be applied to the plates B, B, but with this screw $f$, solely the outer ends of the plates B, are liable to spring apart and thereby to distort the outline of the object D to be copied. To obviate this I have provided a rod F, that has a head or enlargement $g$, at one end and a thumb nut or the like $h$, at the opposite end, as shown, which rod F, passes through slots $i$, in the plates B (see Fig. 3) whereby the rod F, is adjustable in said slots, or can be moved along the plates B, as near their outer ends as the slots $i$, will permit, so that when the screw $h$, is set the plates B, will be held firmly at their outer ends and the contour of the object D, taken by the ends of the plates B will be preserved.

G, is a stationary rod that is carried by the frame A, and passes through the slots $i$, in the plates B, to guide them in the frame and prevent them from becoming detached from the frame, also to prevent lateral movement of the plates B, when they are pushed outward to take the outline of an object.

H, is a rule, rod, or the like that is carried by the frame A at the side opposite to that from which the plates B, are projected to take the outline of an object, and said rule or rod H, may be provided with a rule-joint to cause it to form a perfect right angle with the frame A, when lowered to its horizontal position as in Fig. 2. But the rule or rod H, can be placed in any desired position or angle corresponding to the position of the parts to be copied, so that an exact reproduction of said object and its surrounding parts can be portrayed. I prefer that the rule or rod H should fold up snugly within the frame A, and for this purpose I provide the upper block or rod $e$, with a recess $e^2$, into which the end of the rule or rod H, can fit, (see Fig. 1.)

The outer ends of the plates B, are preferably beveled, as shown, to produce a fine point for engagement with the object D, so that a perfect reproduction can be taken and easily traced with a pencil when the tool is laid down for that purpose.

I prefer that the plates B should be narrow and thin, and that the rods or bars F, G, should be rectangular as shown, so that lateral movement of the plates would be prevented.

In using my scribing tool the screws $f$, and $h$, are first loosened, and then the plates B, are pushed outward to present their pointed ends against the object D, to be copied. This will be done by passing the fingers into the openings $a$, $a$, in frame A, and when the outline has been procured the screw $f$, is forced down, and the rod F, moved outward through slots $i$, near the ends of plates B, the screw $h$, being then set to hold the plates firmly together. By this means the outline is preserved perfectly. The rule or rod H, may first be extended to take the relative angle of the scribing tool with the adjacent object.

The plates B, can be modified in form as desired, for instance by making them of rods.

The device will be found simple in construction, and effective in use, and not liable to get out of order.

The device can be used to take the outline of a person's face to produce silhouettes, whereby great amusement and instruction can be furnished.

Having now described my invention, what I claim is—

1. In a scribing tool the frame A, combined with plates B, within the same and having slots $i$, and with a rigid rod G, carried by the frame and secured at its ends thereto and passing through said slots, whereby the plates will be held in the frame, and prevented from lateral movement and from sliding from the frame, substantially as described.

2. In a scribing tool a frame A, combined with plates B, having slots $i$, and with rod F, adjustable in said slots, for holding the outer ends of the plates in position, substantially as described.

3. The combination of the frame A, plates B, having slots $i$, rod G, held in said frame and passing through said slots, and rod F, passing adjustably through said slots to hold said plates, substantially as described.

4. In a scribing tool, the combination of the frame A, plates B, therein and adjustable rule or rod H, carried by the frame, substantially as described.

5. In a scribing tool the combination of a frame, plates B, therein, rod or rule H, pivotally carried by the frame at one end, and a recess in said frame to receive the other end of said rod or rule, to hold it snugly in the frame, substantially as described.

Signed at New York, in the county of New York and State of New York, this 7th day of June, A. D. 1892.

CHARLES H. VAUSE.

Witnesses:
T. F. BOURNE,
WM. S. TISDALE.